(12) United States Patent
Chao et al.

(10) Patent No.: US 7,598,908 B2
(45) Date of Patent: Oct. 6, 2009

(54) METHOD AND APPARATUS FOR REDUCING INTERFERENCE IN A WIRELESS DEVICE

(75) Inventors: Jim Jingfu Chao, Naperville, IL (US); Subramanian Vasudevan, Morristown, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 11/950,823

(22) Filed: Dec. 5, 2007

(65) Prior Publication Data

US 2009/0146880 A1 Jun. 11, 2009

(51) Int. Cl.
*G01S 1/02* (2006.01)

(52) U.S. Cl. .............................. 342/357.1; 342/357.08; 342/357.15

(58) Field of Classification Search ............ 342/357.02, 342/357.06, 357.1, 357.12, 357.15; 701/207, 701/213, 215
See application file for complete search history.

(56) References Cited

U.S. PATENT DOCUMENTS 6,150,980 A * 11/2000 Krasner .................... 342/357.1
2006/0038719 A1* 2/2006 Pande et al. ............ 342/357.12

* cited by examiner

*Primary Examiner*—Dao L Phan

(57) ABSTRACT

A method of reducing interference in a GPS-equipped wireless device having a transmitter, the method comprising: acquiring a GPS signal containing GPS data; decoding the GPS data; determining whether the GPS data is valid; when the GPS data is not valid due to the interference, determining a transmit power level of the transmitter; and when the transmit power is not zero, reducing the transmit power level by one step.

16 Claims, 2 Drawing Sheets

METHOD AND APPARATUS FOR REDUCING INTERFERENCE IN A WIRELESS DEVICE

BACKGROUND OF THE INVENTION

This invention relates to a method and apparatus for reducing interference in a wireless device. While the invention is particularly directed to the art of telecommunications and will be thus described with specific reference thereto, it will be appreciated that the invention may have usefulness in other fields and applications.

By way of background, people frequently use communication networks on a daily basis at work, at home, and on the road. Consequently, many people carry a wireless device, such as a cell phone, a PDA, a BlackBerry, etc, when they are in transit. At home, people have access to a landline phone and/or a PC connected to a public network. With this access to communication devices, people are able to contact emergency services, such as 911 services, in case of an emergency event (e.g., a fire, a medical emergency, a burglary, etc).

"911" has been designated in the United States as the number to be used by the public to summon emergency aid or to report a crime, fire, or accident. A caller in response to an emergency event dials 9-1-1 on their telephone. In the original 911 service, known as Basic 911 (B911), the call is routed to one centralized answering location. The agent at the answering location converses with the caller to obtain pertinent information on the emergency event. The agent then determines the appropriate agency or emergency personnel to dispatch, and dials the number to transfer the caller to that agency. Enhanced 911 services, or E911, provide some enhancements to the Basic 911 service. For instance, E911 automatically provides the agent with information on the caller, such as a street address, medical conditions, etc. That way if the caller is incapacitated in some manner, then the emergency personnel would be able to go to the location of the caller.

A wireless communications device such as a mobile phone may be equipped with a GPS (Global Positioning System) receiver to support geo-location services. However, E911 service may cause interference with the built-in GPS receiver due to the second harmonic of its mobile transmission when the mobile phone transmit frequency range falls within half of the GPS frequency band.

For example, the GPS L1 Band (Civilian Navigation) has a range from 1565.42 MHz to 1585.42 MHz, and it is centered at 1575.42 MHz. The second harmonic of the Upper 700 MHz C or D Block mobile transmitter could interfere with its own L1 Band GPS receiver.

This problem can be addressed through mobile RF circuitry design, such as implementing better antenna isolation or using a better low-pass filter, etc. However, such solutions may be very costly and prove more difficult to implement. For example, a good low-pass filter may cost more than the mobile device itself. And any antenna isolation circuitry may be complicated in design, especially in a small space like mobile device.

The present invention contemplates a new and improved that resolves the above-referenced difficulties and others.

SUMMARY OF THE INVENTION

A method and apparatus for reducing interference in a wireless device are provided.

In one aspect of the invention a method of reducing interference in a GPS-equipped wireless device having a transmitter is provided. The method comprises: acquiring a GPS signal containing GPS data; decoding the GPS data; determining whether the GPS data is valid; when the GPS data is not valid due to the interference, determining a transmit power level of the transmitter; and when the transmit power is not zero, reducing the transmit power level by one step.

In another aspect of the invention an apparatus for reducing interference in a GPS-equipped wireless device having a transmitter is provided. The apparatus comprises: a GPS receiver for acquiring a GPS signal containing GPS data, decoding the GPS data, and determining whether the GPS data is valid; means for determining a transmit power level of the transmitter when the GPS data is not valid due to the interference; and means for reducing the transmit power level by one step when the transmit power level is not zero.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

DETAILED DESCRIPTION

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

Figure 1:
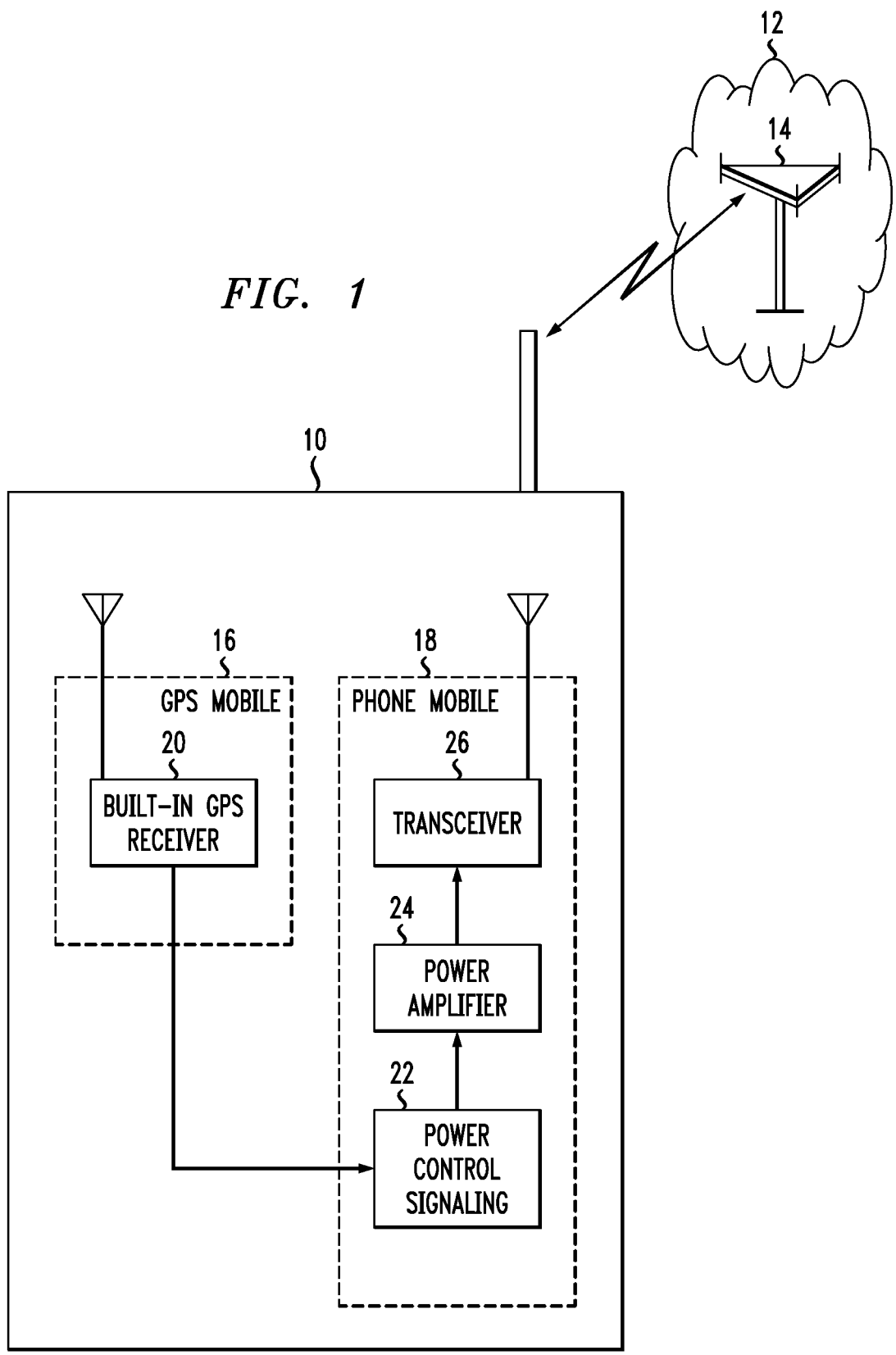
FIG. 1 is a diagram of a mobile phone with a built-in GPS receiver.

Referring now to the drawings wherein the showings are for purposes of illustrating the exemplary embodiments only and not for purposes of limiting the claimed subject matter, FIG. 1 provides a view of a wireless device 10 into which the presently described embodiments may be incorporated. The wireless device 10 is shown as a mobile phone in FIG. 1; however, it may also be a wireless PDA, a computerized vehicle navigation system, a wireless device with high-speed data transfer capabilities, such as those compliant with "3-G" or "4-G" standards, a "WiFi"-equipped computer terminal, or the like.

The wireless device 10 is generally in communication with a wireless network 12. The wireless network 12 comprises any wireless network for providing voice and/or data communications, such as a cellular network, a PCS network, etc. The wireless network 12 includes a base station 14, which is configured to provide wireless service to any number of wireless devices. The base station 14 may communicate with wireless devices using Code Division Multiple Access (CDMA), Time Division Multiple Access (TDMA), Global System for Mobile Communication (GSM), Universal Mobile Telecommunications System (UMTS), 802.11 WiFi, BlueTooth (Registered), satellite, packet radio, or another protocol. The wireless network 12 may include many other base stations (not shown) to provide service to many mobile subscribers (not shown). It is to be understood that the wireless network 12 may include other devices, systems, or components not shown in FIG. 1, such as additional base stations, additional MSCs, a Home Location Register (HLR), etc. Further, the wireless network 12 may have interconnections not shown in FIG. 1. As shown generally, the wireless device 10 includes a GPS module 16 and a phone module 18.

The GPS module 16 generally includes a built-in GPS receiver 20 by which the wireless device 10 can obtain and store geographic position location information in automated fashion without user action.

The phone module 18 generally includes a power control signaling function 22, a power amplifier 24, and a transceiver 26. The mobile transceiver 26 generally includes a transmitter and a receiver for communicating with the corresponding base station receiver or transmitter via one or more links. A link typically may comprise a plurality of communication channels such as signaling channels and traffic channels, for example. Traffic channels are communication channels through which users convey (i.e., transmit and/or receive) user information. Signaling channels may be used by the system equipment to convey signaling information used to manage, operate and otherwise control the system. The system equipment, which may be typically owned, maintained and operated by a service provider, may include various known radio and processing equipment used in communication systems. The system equipment along with user equipment, for example, mobile phones, generates and receives the signaling information.

In a CDMA system, for example, the cells may be operated on the same frequency band (i.e., with a frequency reuse of one, or K=1) to achieve better utilization of the available system resources. In that case, the transmission from each transmitting entity (e.g., the wireless device 10) may act as interference to the transmissions from other transmitting entities. To minimize interference and increase system capacity on the reverse link, the transmit power of each transmitting access terminal may be controlled such that a desired level of performance is achieved while minimizing the amount of interference to other transmitting access terminals. This transmit power adjustment is achieved by a power control loop maintained for each transmitting wireless device.

Typical power control commands direct a mobile phone or other wireless device to raise or lower its transmit power. In general, the power control algorithm may be performed at the base station. In looking at a signal received from a mobile phone, if the signal looks weak (e.g., based on detected frame error rate (FER), for example), the base station may send a command to either increase or decrease mobile station transmit power. For example, a comfortable level of quality in a voice system may be possible with a FER of approximately 1%. If FER is much less than 1%, the mobile station may be wasting power, so the power control algorithm implemented at the base station may send commands to the mobile requesting the mobile to reduce the transmit power. For FER much greater than 1%, the level of quality may be degraded, so the base station may send a command to the mobile to bring the mobile transmit power up in order to restore quality.

Figure 2:
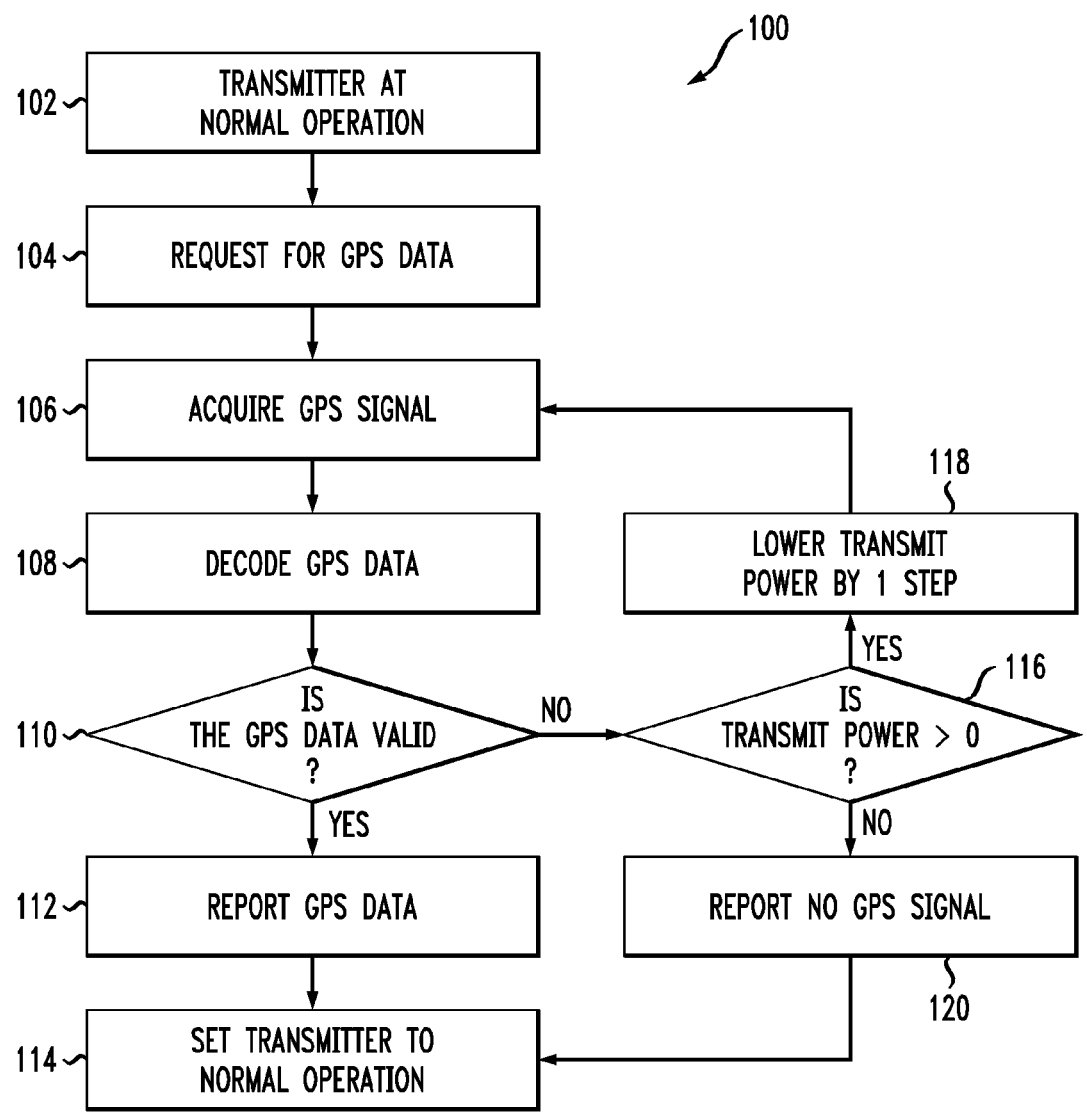
FIG. 2 is an exemplary GPS data acquisition operation for the mobile phone of FIG. 1 in accordance with aspects of the present invention.

With this invention, the interference from the mobile transmitter 14 to its own GPS receiver 20 is reduced by lowering or gating the mobile transmit power. However, it is to be understood that E911 is just one example. The interference may occur with any other service, such as voice and all kinds of data communication, as long as these services use the public safety band. FIG. 2 illustrates an exemplary GPS data acquisition operation 100 for the wireless device 10. As indicated in FIG. 2, the mobile transmitter is at normal operation (102). When GPS data is requested (104), the built-in GPS receiver 20 will try to acquire a GPS signal (106) and then decode the GPS data (108). The GPS receiver 20 will then determine whether the GPS data is valid or not (110). if the GPS data is valid, then the GPS data is reported to the mobile station phone module 18 (112), and the mobile transmitter is set to normal operation (114). However, if the GPS data is not valid, then the mobile transmit power is checked (116). If the mobile transmit power is not zero (normally that is the case), then the mobile transmit power will be mandatorily reduced by one step, say one dB (118). By reducing the mobile transmit power, the interference from the wireless device 10 to its own GPS receiver 20 is reduced. Then, the GPS receiver 20 will try to acquire (106) and decode (108) the GPS data again. If the GPS data is still not valid, then the transmit power will be reduced again. This process will go on until either the GPS receiver 20 receives good GPS data or the transmit power has been reduced to zero. If the transmit power has been reduced to zero but the GPS data is still not good, which means that the GPS signal is not good in that location, then the operation has failed.

On the other hand, if the mobile transmit power is zero then the GPS receiver 20 will report that there is no GPS signal (120), and the mobile transmitter will be set to normal operation (114).

Once the successful measurement of the GPS signal has been completed, it is necessary for the wireless device 10 to retransmit at the power level that will result in successful reception of its transmission at the base station 14. To ensure this, the wireless device 10 tracks and aggregates the power control commands during the interval that it lowered its transmit power for GPS measurement purposes. This information can be stored as one parameter. For example, let us say that the wireless device 10 lowered its power by x dB (x is positive) for successful GPS measurement, and during that interval it received y dB of mobile transmit power adjustment commands (y is the sum of the increment and decrement commands over the GPS measurement interval). Upon completion of the GPS measurement, the wireless device 10 adjusts its transmit power upwards by x−y dB to reach the level of transmit expected by the base station 14 to enable successful reception of the other device's transmission.

It should be noted that the mobile station power decrementing rule described above never results in the wireless device 10 transmitting at a higher power that the base station 14 expects it to. So, for example, if the base station directed power control step is 1 dB per power control group (one or more contiguous slots, that is, an interval for which the power control commands are valid) the wireless device 10 decrements its power for GPS measurement purposes by at least 1 dB over that group.

Another approach is for the wireless device 10 to gate its transmissions during GPS measurement, concurrently notifying the base station that it is doing so.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

We claim:

1. A method of reducing interference in a GPS-equipped wireless device having a transmitter, the method comprising:
    acquiring a GPS signal containing GPS data;
    decoding the GPS data;
    determining whether the GPS data is valid;
    when the GPS data is not valid due to the interference, determining a transmit power level of the transmitter; and
    when the transmit power level is not zero, reducing the transmit power level by one step.

2. The method of claim 1, further comprising:
    when the transmit power level is zero, reporting that there is no GPS signal and setting the mobile transmitter to normal operation.

3. The method of claim 1, further comprising:
    when the GPS data is valid, reporting the GPS data and setting the mobile transmitter to normal operation.

4. The method of claim 1, wherein the interference is caused by E911 service.

5. The method of claim 1, further comprising:
    tracking and aggregating power control commands during an interval when the transmit power level was lowered for GPS measurement purposes; and
    retransmitting at a transmit power level that will result in successful reception of a transmission at a base station.

6. The method of claim 1, wherein one step comprises one dB.

7. An apparatus for reducing interference in a wireless device, the apparatus comprising:
    a GPS receiver for acquiring a GPS signal containing GPS data, decoding the GPS data, and determining whether the GPS data is valid;
    means for determining transmit power of the transmitter when the GPS data is not valid due to the interference; and
    means for reducing the transmit power level by one step when the transmit power is not zero.

8. The apparatus of claim 7, further comprising:
    means for reporting that there is no GPS signal and setting the mobile transmitter to normal operation when the transmit power is zero.

9. The apparatus of claim 7, further comprising:
    means for reporting the GPS data and setting the mobile transmitter to normal operation when the GPS data is valid.

10. The apparatus of claim 7, wherein the interference is caused By E911 service.

11. The apparatus of claim 7, further comprising:
    means for tracking and aggregating power control commands during an interval when the transmit power level was lowered for GPS measurement purposes; and
    means for retransmitting at a transmit power level that will result in successful reception of a transmission at a base station.

12. The apparatus of claim 7, wherein one step comprises one dB.

13. A method of reducing interference in a GPS-equipped wireless device having a transmitter, the method comprising:
    acquiring a GPS signal containing GPS data;
    decoding the GPS data;
    determining whether the GPS data is valid;
    determining a transmit power level of the transmitter when the GPS data is not valid due to interference caused by E911 service;
    reducing the transmit power level by at least one step when the transmit power level is not zero; and
    reporting that there is no GPS signal and setting the mobile transmitter to normal operation when the transmit power level is zero.

14. The method of claim 13, wherein one step comprises one dB.

15. The method of claim 13, further comprising:
    reporting the GPS data and setting the mobile transmitter to normal operation when the GPS data is valid.

16. The method of claim 15, further comprising:
    tracking and aggregating power control command data during an interval when the transmit power level was lowered for GPS measurement purposes;
    storing the data as one parameter in a database; and
    retransmitting at a transmit power level that will result in successful reception of a transmission at a base station.

* * * * *